US012578699B2

(12) United States Patent　(10) Patent No.:　US 12,578,699 B2

Feist et al.　(45) Date of Patent:　Mar. 17, 2026

(54) METHOD AND SYSTEM FOR PROVIDING CONTROL APPLICATIONS FOR AN INDUSTRIAL AUTOMATION SYSTEM

(71) Applicant: Siemens Aktiengesellschaft, Munich (DE)

(72) Inventors: Christian Peter Feist, Munich (DE); Harald Albrecht, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/716,587

(22) PCT Filed: Nov. 14, 2022

(86) PCT No.: PCT/EP2022/081754

§ 371 (c)(1),
(2) Date: Jun. 5, 2024

(87) PCT Pub. No.: WO2023/104432

PCT Pub. Date: Jun. 15, 2023

(65) Prior Publication Data

US 2025/0021070 A1　Jan. 16, 2025

(30) Foreign Application Priority Data

Dec. 7, 2021　(EP) ..................................... 21212849

(51) Int. Cl.
G05B 19/042　(2006.01)
(52) U.S. Cl.
CPC ................................. G05B 19/0428 (2013.01)
(58) Field of Classification Search
CPC ................................................ G05B 19/0428

(Continued)

(56) References Cited

U.S. PATENT DOCUMENTS

2005/0060388 A1* 3/2005 Tatsumi .................. G06F 21/10
709/220
2005/0160045 A1 7/2005 Watanabe et al.
(Continued)

FOREIGN PATENT DOCUMENTS

CN　1992724　7/2007
CN　101939747　1/2011
(Continued)

OTHER PUBLICATIONS

PCT International Search Report dated Feb. 15, 2023 based on PCT/EP2022/081754 filed Nov. 14, 2022.

*Primary Examiner* — Thomas C Lee
*Assistant Examiner* — Michael Tang
(74) *Attorney, Agent, or Firm* — Cozen O'Connor

(57) ABSTRACT

A method for providing control applications, wherein each of the control applications is provided by a flow control component, which is loadable onto a flow control environment formed via a server device and that is executed thereon, where control applications that require selected security authorizations are assigned a respective label as security-critical control applications, at least one respective flow condition is ascertained for the selected security authorizations for the control applications that are assigned a label as a security-critical application, the flow control environment checks for the occurrence of the respective flow condition while the flow control components for the control applications are being executed, and where the execution of each of the flow control components is terminated when the respective flow condition occurs.

14 Claims, 2 Drawing Sheets

(58) Field of Classification Search
USPC ............................................................ 700/9
See application file for complete search history.

(56) References Cited

U.S. PATENT DOCUMENTS

| | | | | | |
|---|---|---|---|---|---|
| 2006/0020790 | A1* | 1/2006 | Sprunk | ............ | H04N 21/63345 |
| | | | | | 713/167 |
| 2007/0130073 | A1* | 6/2007 | Celli | .................... | G06F 21/121 |
| | | | | | 705/51 |
| 2008/0183976 | A1* | 7/2008 | Bliss | .................... | G05B 19/056 |
| | | | | | 711/E12.001 |
| 2009/0165083 | A1 | 6/2009 | McLean et al. | | |
| 2012/0110645 | A1 | 5/2012 | Spalka et al. | | |
| 2013/0167250 | A1* | 6/2013 | Balasubramanian | ... | H04L 63/00 |
| | | | | | 726/28 |
| 2016/0066186 | A1* | 3/2016 | Kim | ...................... | H04M 15/66 |
| | | | | | 455/406 |
| 2016/0162693 | A1* | 6/2016 | Breuer | ................. | G06F 3/0637 |
| | | | | | 713/164 |
| 2017/0243229 | A1* | 8/2017 | Dokai | ................. | G06Q 30/018 |

| | | | | | |
|---|---|---|---|---|---|
| 2017/0357810 | A1* | 12/2017 | Gorbaty | ................. | G06F 16/22 |
| 2022/0245120 | A1* | 8/2022 | Hanson | ................. | G06F 16/245 |
| 2022/0337082 | A1* | 10/2022 | Lawrence | ......... | H02J 13/00022 |
| 2023/0254692 | A1* | 8/2023 | Kim | ...................... | H04W 12/61 |
| | | | | | 726/6 |

FOREIGN PATENT DOCUMENTS

| | | | | |
|---|---|---|---|---|
| CN | 102160354 | | 8/2011 | |
| CN | 103020854 | | 4/2013 | |
| CN | 109246140 | | 1/2019 | |
| CN | 111328395 A | * | 6/2020 | ......... G06F 21/6281 |
| DE | 112010004526 T5 | * | 10/2012 | ............. G06F 21/51 |
| EP | 3557463 | | 10/2019 | |
| EP | 3557463 A1 | * | 10/2019 | ............. G06F 21/51 |
| EP | 3813315 | | 4/2021 | |
| JP | 2009099136 A | * | 5/2019 | ............. G06Q 10/06 |
| WO | WO-2006032617 A1 | * | 3/2006 | ......... G06F 11/0715 |
| WO | WO-2019091738 A1 | * | 5/2019 | ......... G06F 21/6281 |
| WO | 2020249345 | | 12/2020 | |
| WO | 2021104632 | | 6/2021 | |
| WO | 2022042905 | | 3/2022 | |

* cited by examiner

METHOD AND SYSTEM FOR PROVIDING CONTROL APPLICATIONS FOR AN INDUSTRIAL AUTOMATION SYSTEM

CROSS-REFERENCE TO RELATED APPLICATIONS

This is a U.S. national stage of application No. PCT/EP2022/081754 filed 14 Nov. 2022. Priority is claimed on European Application No. 21212849.0 filed 7 Dec. 2021, the content of which is incorporated herein by reference in its entirety.

BACKGROUND OF THE INVENTION

1. Field of the Invention

The present invention relates to a system and monitoring method for providing control applications for an industrial automation system.

2. Description of the Related Art

Industrial automation systems usually comprise a multiplicity of automation devices that are networked with one another via an industrial communication network and that are used, as part of manufacturing or process automation, to control or regulate installations, machines and devices. Due to time-critical constraints in industrial automation systems, real-time communication protocols, such as PROFINET, PROFIBUS, Real-Time Ethernet or Time-Sensitive Networking (TNS), are predominantly used for communication between automation devices. In particular, control services and applications may be distributed automatically and in a utilization-dependent manner among currently available servers or virtual machines of an industrial automation system.

Interruptions to communication connections between computer units of an industrial automation system or automation devices may lead to undesirable or unnecessary repetition of transmission of a service request. Moreover, messages that are not transmitted, or not transmitted completely, may prevent an industrial automation system from transitioning to or remaining in a secure operating state, for example.

EP 3 813 315 A1 discloses a method for diagnosing data traffic in a cluster comprising multiple working nodes, in which containers or pods are provided by the working nodes. A cluster capture module is used to capture information as to which working nodes are assigned a node capture module. If the cluster capture module receives a request to capture data packets, then the cluster capture module contacts the node capture modules of the nodes in question, and the node capture modules capture data packets. Moreover, the node capture modules forward the captured data packets or their duplicates to the cluster capture module. The cluster capture module forwards the captured data packets or duplicates in turn to a respectively requesting unit.

WO 2021/104632 A1 relates to a method for capturing data packets that originate from a first container within a cluster of containers. Here, each container is assigned multiple network interfaces for the transmission of data packets. As soon as a first connection for the transmission of data packets via a first network interface that is assigned to the first container is detected, an identifier assigned to the first container is inserted into a data stream assigned to the first connection. The inserted identifier may then be used to identify the first container for the capture of data packets that originate therefrom.

Earlier international patent application WO 2022/042905 A1 relates to a method for providing time-critical services that are each assigned at least one server component that is formed by a runtime control component able to be loaded into a runtime environment and executed there. A respective functional unit for processing a communication protocol stack is made available to the server components and is connected to a functional unit, assigned to the runtime environment, for processing a communication protocol stack. The services each comprise a directory service component for determining services provided via the runtime environment. The directory service components are connected to one another via a separate communication interface. An aggregator component that is formed via a further runtime control component is connected to the separate communication interface and makes available information about the services provided via the server components to outside the runtime environment.

WO 2020/249345 A1 discloses a method for providing control applications in which a configuration control device queries communication network addresses of runtime control components and identifiers of the runtime control components from a monitoring device and assigns this information to the control applications. The configuration control device generates configuration information for a forwarding device from the queried communication network addresses and identifiers and from names of the control applications. The forwarding device receives requests from terminals to use the control applications and forwards these to a respective runtime control component in accordance with the configuration information.

EP 3 557 463 A1 relates to an execution environment for preventing the execution of manipulated program code on field devices. The execution environment comprises a function memory that is configured to store check functions, and a configuration memory that is configured to store execution requests for check ranges. The configuration memory is protected via a manipulation detection module. The execution requirements may be configured in a configuration mode of the execution environment. Provision is also made for an execution unit that is configured, via the check function, to determine a check result that indicates whether the respective check range meets the execution requirements. Furthermore, the execution unit is configured to execute a respective program command or program code depending on the check result.

For flexible provision of automation functions, automation devices are making increasing use of downloadable control applications, which are made available, for example, via container virtualization. In particular, control applications for analyzing data traffic within an industrial automation system or for analyzing control processes running in automation devices require extensive privileges and security authorizations. Security vulnerabilities in such diagnostic applications often lead to considerable security risks for automation devices or cells as a whole. The longer potentially manipulable control applications remain installed on automation devices, the higher the security risks within an industrial automation system.

SUMMARY OF THE INVENTION

In view of the foregoing, it is therefore an object of the present invention to provide a device and a secure method, which can be implemented with low outlay, for providing control applications requiring extensive security authorizations for an industrial automation system.

This and other objects and advantages are achieved in accordance with the invention by a system and method for providing control applications for an industrial automation system, where the control applications are each provided via runtime control components. The runtime control components can be loaded into a runtime environment formed via a server device and executed therein. Advantageously, a respective runtime control component is loadable into the runtime environment and executed there for each application instance. Furthermore, the runtime control components can be migrated onto respective other server devices for execution there or can be executed simultaneously on respective other server devices.

The runtime control components may in particular be or comprise software containers that each execute in isolation from other software containers or container groups, such as pods, within the runtime environment on a host operating system of a server device. In principle, alternative micro-virtualization concepts, such as snaps, may also be used for the runtime control components. The software containers each preferably use a kernel of the host operating system of the server device together with other software containers running on the respective server device. Memory images for the software containers may, for example, be retrieved from a memory and a provision system that can be accessed by a multiplicity of users in read mode and/or in write mode.

The runtime environment may in particular be a container runtime environment or container engine via which virtual resources are applied, erased or linked. Here, the virtual resources comprise software containers, virtual communication networks and connections assigned thereto. By way of example, the runtime environment may comprise a docker engine or a snap core that runs on a server device.

In accordance with the invention, control applications that require selected security authorizations are each assigned an identifier as a security-critical control application. In each case, at least one expiration condition for the selected security authorizations is defined for the control applications to which an identifier as a security-critical control application is assigned. The runtime environment, during execution of the runtime control components, monitors the respective occurrence of the respective expiration condition for the control applications. The execution of the runtime control components is terminated in each case upon the occurrence of the respective expiration condition. Preferably, the execution of the runtime control components is started in each case only when the expiration condition has not yet occurred. Furthermore, the expiration conditions may in particular each comprise a maximum execution time for the respective runtime control component. The expiration conditions are thus able to be defined easily and clearly.

The present invention makes it possible for example to ensure that diagnostic applications having extensive security authorizations remain activated or installed on a device only as long as required by the use of these applications. This prevents applications that represent security-critical potential attack targets from remaining installed for a relatively long time on a device or even running at all after they have been used for convenience reasons or due to lack of attention.

In accordance with one preferred embodiment of the present invention, the execution of the runtime control components is terminated in each case by the execution of an action defined in a security policy upon the occurrence of the respective expiration condition. Here, the defined action may in particular comprise stopping or erasing the respective runtime control component. Advantageously, the security policy defines in each case the expiration condition based on the identifier of the respective control application. Overall, this enables flexible adjustment of the expiration conditions and defined actions for requirements of operators of an industrial automation system.

Preferably, the identifiers of the control applications define a respective security policy to be applied. Moreover, the identifiers may each be used to denote or specify functions of the control applications or security authorizations required to provide the control applications. This enables easy-to-handle use of the identifiers to reliably define required security authorizations or privileges of the control applications. Particularly simple handling results when the identifiers, in accordance with a further advantageous embodiment of the present invention, are each added as a character string to metadata for the respective control application. Identifiers may thereby in particular be defined by an administrative intervention, automatically or when publishing container images.

The system in accordance with the invention for providing control applications for an industrial automation system comprises a runtime environment formed via a server device and at least one runtime control component for providing a control application. The runtime control component is loadable into the runtime environment and executed therein. Moreover, the system is configured such control applications that require selected security authorizations are each assigned an identifier as a security-critical control application and such that at least one expiration condition for the selected security authorizations is defined for each of the control applications to which an identifier as a security-critical control application is assigned. Moreover, the runtime environment is configured, during execution of the runtime control components, to monitor the respective occurrence of the respective expiration condition for the control applications and that the execution of the runtime control components is terminated in each case upon the occurrence of the respective expiration condition.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in more detail below with reference to an exemplary embodiment based on the drawing, in which.

DETAILED DESCRIPTION OF THE EXEMPLARY EMBODIMENTS

Figure 1:
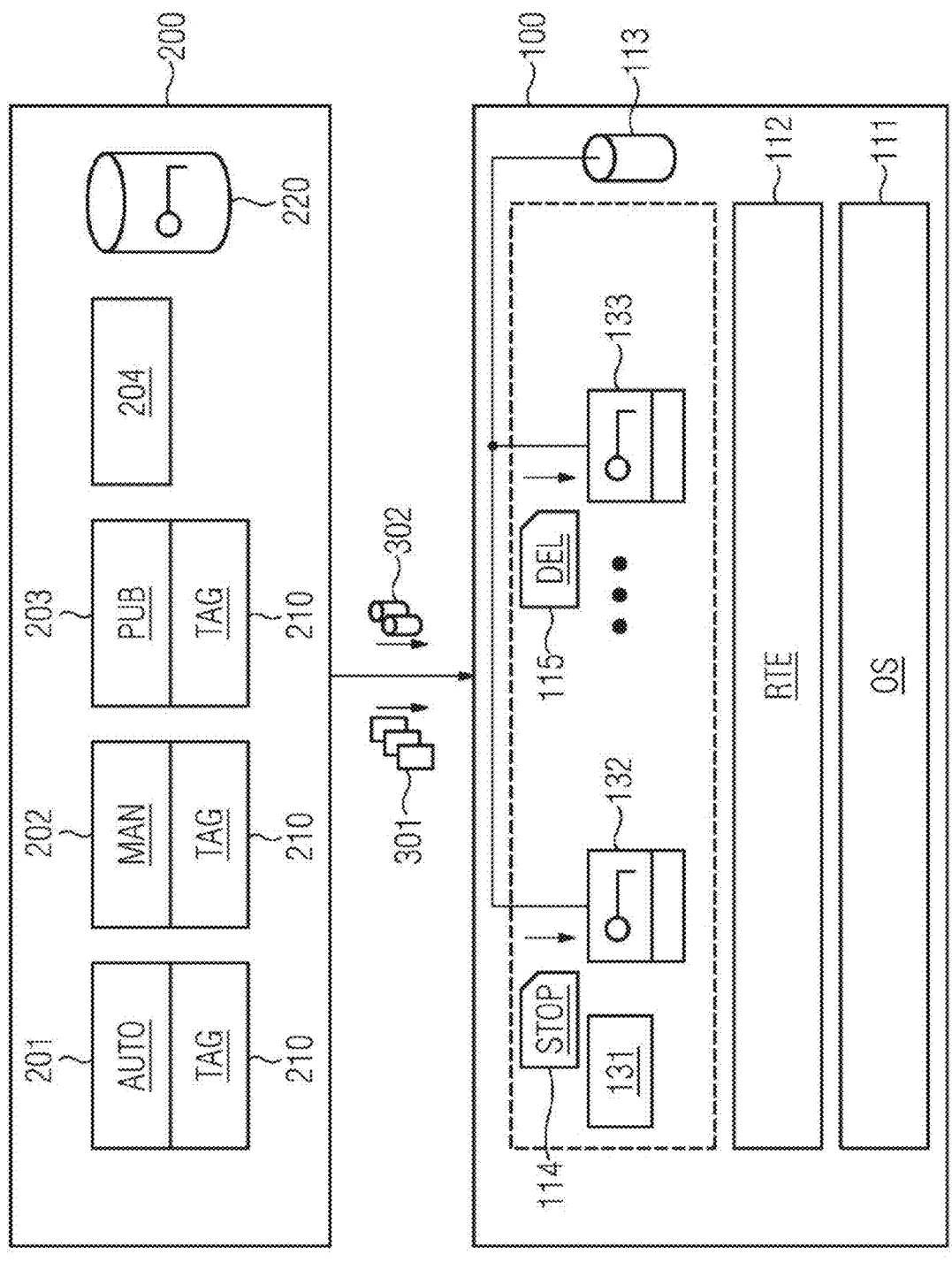
FIG. 1 shows a an inventive system for providing control applications that require selected security authorizations.

The system illustrated in FIG. 1 comprises a server device 100 for providing control applications 201, 202, 203, 204 of an industrial automation system. The control applications 201, 202, 203, 204 of the industrial automation system are examples of time-critical services and may also comprise monitoring functions. The control applications may be provided for example on the basis of Open Platform Communications Unified Architecture (OPC UA).

The server device 100 can, via the control applications 201-204, for example, implement functions of control devices of an industrial automation such system, as programmable logic controllers, or field devices, such as sensors or actuators. The server device 100 can thereby be used in particular to exchange control variables and measured variables with machines or apparatuses controlled by the server device 100. Here, the server device 100 can determine suitable control variables for the machines or apparatuses from captured measured variables.

As an alternative or in addition, the server device 100 can implement functions of an operating and observation station by way of the control applications 201, 202, 203, 204 and thus can be used to visualize process data or measured variables and control variables that are processed or captured by automation devices. In particular, the server device 100 may be used to display values of a control circuit and to change control parameters or programs.

Furthermore, the system illustrated in FIG. 1 comprises a management system 200 via which a respective identifier 210 as a security-critical control application is assigned for control applications 201, 202, 203 that require selected security authorizations. The identifiers 210 are formed, in the present exemplary embodiment, by tags that are each addable as a character string to metadata for the respective control application 201, 202, 203. The tags may furthermore, for example, be assigned automatically for first control applications 201, manually for second control applications 202 or when publishing memory images or images in an app repository for third control applications 203. In principle, fourth control applications 204 that do not have a tag assignment may also be managed via the management system 200.

The identifiers 210 of the control applications 201, 202, 203 advantageously define a security policy to be respectively applied, which is stored as a dataset in a corresponding database 220. Furthermore, the identifiers 210 preferably each denote or specify functions of the control applications 201, 202, 203 or security authorizations required to provide the control applications 201, 202, 203. In the present exemplary embodiment, the management system 200 is furthermore used to define at least one expiration condition for each of the selected security authorizations for the control applications 201, 202, 203 to which an identifier as a security-critical control application is assigned. These expiration conditions are likewise recorded in the database 220.

After the control applications 201, 202, 203, 204 have been captured or provided and classified and the expiration conditions have been defined, a selection 301 of the control applications 201, 202, 203, 204 to be provided by the server device 100 and a selection 302 of the security policies to be applied by the server device 100 are transmitted from the management system 200 to the server device. The selection 301 of the control applications 201-204 comprises in particular their memory images or images. The server device may in principle also retrieve images for software containers from a memory and provision system that can be accessed by a multiplicity of users in read mode and/or in write mode.

In the server device 100, the control applications 201, 202, 203, 204 are each provided via runtime control components 131, 132, 133 that can be loaded into a runtime environment 112 formed via the server device 100 and executed therein. The runtime environment 112 is installed as an application on a host operating system 111 of the server device 100. Moreover, runtime control components 131, 132, 133 may each be migrated from the server device 100 onto another server device for execution there or executed simultaneously on other server devices.

In the present exemplary embodiment, the runtime control components 131, 132, 133 are or comprise software containers that each run/execute in isolation from other software containers, container groups or pods within the runtime environment 112 on the host operating system 111 of the server device 100. Here, the software containers each use a kernel of the host operating system 111 of the server device 100 together with other software containers running on the server device 100. The runtime environment 112 is preferably a container runtime environment or container engine.

Isolation of the runtime control components or isolation of selected operating system resources from one another may be achieved in particular via control groups and namespacing. Control groups make it possible to define process groups to restrict available resources for selected groups. Namespaces make it possible to isolate or conceal individual processes or control groups from other processes or control groups.

Figure 2:
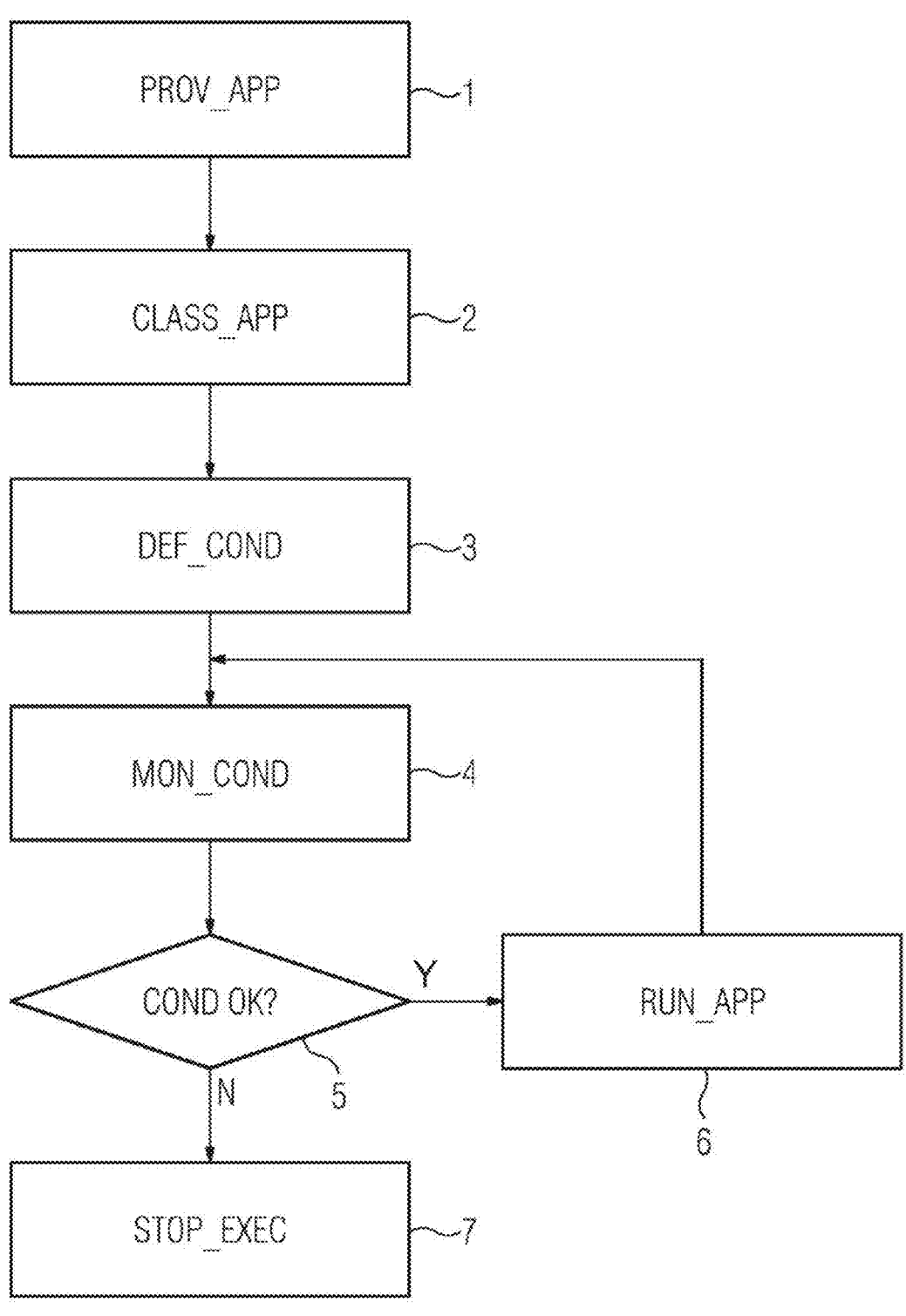
FIG. 2 shows an illustration of a method sequence for providing control applications via the inventive system illustrated in FIG. 1.

In accordance with the method sequence illustrated in FIG. 2, the control applications are first provided (step 1) and classified (step 2) and the expiration conditions are defined (step 3) in the management system 100 in accordance with the above explanations. Following loading of the software containers 131-133 for the control applications, the runtime environment 112 monitors the respective occurrence of the respective expiration condition (step 4) during execution of the software containers 131, 132, 133. In particular, the execution of the software containers 131, 132, 133 is started only when the expiration condition has not yet occurred. Preferably, the expiration conditions each comprise a maximum execution time for the respective software container 131, 132, 133.

If monitoring in accordance with step 5 does not reveal any basis for further execution, then the execution of each of the software containers 131, 132, 133 is terminated upon occurrence of the respective expiration condition (step 7). Otherwise, the execution of the software containers 131, 132, 133 is continued in accordance with step 6 and the occurrence of the respective expiration condition in accordance with step 4 continues to be monitored.

The execution of the software containers 131-132 is terminated in each case by execution of an action defined in a security policy 113 to be applied upon the occurrence of the respective expiration condition. By way of example, the defined action may comprise stopping uninstalling the respective software container 132, 133. For this purpose, a corresponding stop command 114 or an erase command 115 is advantageously sent. The security policy 113 preferably defines in each case the expiration condition based on the identifier 210 of the respective control application 201, 202, 203, 204.

In addition to stopping or uninstalling a software container, a variety of other or additional actions may be performed upon the occurrence of the respective expiration condition, for example, warning an operator,
 setting a switching signal,
 flashing an LED on a device,
 generating a log entry,
 restricting access rights of a control application.

The actions may be initiated or implemented in principle by the server device 100 or by the management system 200. By way of example, a stop command may be generated by the container runtime environment 112 itself or by the management system 200. In the latter case, the management system 200 transmits a stop command for execution to the container runtime environment 112.

The present invention can be applied in principle in all devices that enable downloading of applications (apps) based on container virtualization, in particular apps with increased privileges. By way of example, apps may be downloaded in this way in edge devices, IoT gateways, industrial PCs, on-premises server systems or cloud server systems. Increased privileges of the apps may be provided for example in Linux-based systems for special Linux capabilities, such as CAP_NET_ADMIN for administering network resources, in particular routing tables or network interfaces, for extensive access to a host file system or for use of specific system calls (syscalls). Moreover, increased privileges are often also necessary for diagnostic applications that have extensive access rights to network interfaces of other applications. For diagnostic applications, it is possible to store, for example, in a security policy, the fact that control applications to which a tag "diagnostic" is assigned are not allowed to be installed on a device for longer than 12 hours and should be uninstalled automatically by a container runtime environment after this time has elapsed.

The above explanations will now be explained in even more detail with reference to a practical exemplary implementation. First of all, a tag in the form of an image label (key value pair) is defined in a docker-compose.yml configuration file for a network diagnostic app provided by way of a docker container engine when publishing the network diagnostic app: com.siemens.ie.systemapp.expires=true. This tag identifies the network diagnostic app as an app whose period of use should be restricted.

Next, a manufacturer (Siemens in the present exemplary embodiment) of an automation device in which the network diagnostic app is intended to run specifies a simple policy that has the effect that an app with the above tag is stopped 8 hours after it has been installed, erased and a warning is intended to be sent to a device or installation operator. This policy may in principle also be overwritten by the device or installation operator as required.

The network diagnostic app is then loaded onto the automation device and used by the device operator for diagnostic purposes. Owing to the assigned tag com.siemens.ie.system-app.expires=true, the container engine additionally starts to regularly inspect the network diagnostic app with regard to its status. If the container engine identifies in such an inspection that the network diagnostic app has been installed for at least 8 hours and is still running, then the container engine stops the network diagnostic app, uninstalls it and informs the device operator that the network diagnostic app has been uninstalled. Such a scenario may be possible when the device operator has forgotten to uninstall the network diagnostic app after using it.

As an alternative to having the device operator define the tag for the network diagnostic app, the tag may be defined explicitly by a developer of the network diagnostic app. This may be performed, for example, when creating a container image or by selecting an app category, such as "diagnostic" or "regular operation", from a predefined set when publishing the app. Even when the device operator defines the tag, this may be selected, for example, form a predefined set to simplify use, management and transferability to other systems. In accordance with a further alternative, a tag may be allocated automatically or implicitly, in particular depending on which rights are required by an app. If it is stated in deployment information for an app, such as in a docker-compose.yml configuration file, that the app wishes to share a process ID namespace of a host, then a corresponding tag may automatically be added to metainformation of the app. This may in particular be performed when the app is published, when the app is downloaded to the management system 200 or when the app is loaded onto the server device 100.

The policy for the network diagnostic app may be defined, in one simple variant, for the entire automation device in which the network diagnostic app runs. By way of example, such a policy makes it possible to achieve a situation whereby the device operator is warned, in the case of all apps with the tag "diagnostic", when the respective app has already been installed on the automation device for longer than 11 hours. Furthermore, such a warning may comprise an indication that the respective app will be uninstalled automatically 12 hours after its time of installation. Here, the device operator may optionally be offered the possibility for the app to remain installed on the automation device even after the 12 hours have expired in accordance with their express wish.

A further example of a possible policy for apps is that of overwriting a defined time for which an app has not been used. Such a policy may be valid on a device-specific basis or for a number of devices. As an alternative or in addition, other apps running on a device may also be taken into consideration by a policy. It may in particular thus be defined that apps having a certain tag are installed on a device and are allowed to run as long as a certain other app which, for example, processes critical production data, is not running at the same time.

A policy may also take into consideration device states. If, for example, a device is in a setup or maintenance state, selected apps may run without a time restriction. If, on the other hand, the device is in an active operating mode, then the respective expiration condition is checked. The policy may in particular be defined by the device operator in a dialog-based manner when setting up the respective device. For this purpose, for example, the following options are asked on a graphical user interface or on a command line interface:

"Automatically uninstall diagnostic application 12 hours after last use? [Y/N]"

"Automatically uninstall application after stopping? [Y/N]" before loading an app or "Ask every 2 hours whether app should be stopped? [Y/N]". Policies adapted to individual requirements can thereby be created with little outlay.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps that perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for providing control applications for an industrial automation system, the control applications each being provided via runtime control components which are loadable into a runtime environment formed via a server device and executed therein, the method comprising:

assigning to each control application of the industrial automation system, which requires selected security authorizations, an identifier which classifies each control application as a security-critical control application, the identifier being assigned via a management system, and the identifier being formed by tags which are each addable as a character string to metadata for a respective control application;

defining at least one expiration condition for selected security authorizations for each control application of the industrial automation system to which the identifier which classifies each control application as a security-critical control application is assigned;

monitoring, by the runtime environment, a respective occurrence of a respective expiration condition for the control applications during execution of the runtime control components; and terminating execution of each runtime control component upon the occurrence of the respective expiration condition;

wherein the tag is one of assignable (i) automatically for first control applications, (ii) manually for second control applications and (iii) when publishing memory images or images in an app repository for third control applications.

2. The method as claimed in claim 1, wherein the execution of each runtime control component is terminated by executing an action defined in a security policy upon the occurrence of the respective expiration condition.

3. The method as claimed in claim 2, wherein the defined action comprises at least one of stopping and erasing the respective runtime control component.

4. The method as claimed in claim 3, wherein each security policy define the expiration condition based on the identifier of the respective control application.

5. The method as claimed in claim 2, wherein each security policy define the expiration condition based on the identifier of the respective control application.

6. The method as claimed in claim 1, wherein the identifiers of the control applications define a respective security policy to be applied.

7. The method as claimed in claim 1, wherein the identifiers each denotes or specifies at least one of functions of the control applications and security authorizations required to provide the control applications.

8. The method as claimed in claim 1, wherein the identifiers are each added as a character string to metadata for the respective control application.

9. The method as claimed in claim 1, wherein each execution of the runtime control components is started only when an expiration condition has not yet occurred.

10. The method as claimed in claim 1, wherein the expiration conditions each comprise a maximum execution time for the respective runtime control component.

11. The method as claimed in claim 1, wherein the runtime control components are software containers.

12. The method as claimed in claim 11, wherein memory images for the software containers are retrievable from a memory and provision system which is accessible by a multiplicity of users in at least one of read mode and a write mode.

13. The method as claimed in claim 1, wherein the runtime control components are at least one of migratable onto respective other server devices for execution therein and executable simultaneously on the respective other server devices.

14. A system for providing control applications of an industrial automation system, comprising:

a management system via which a respective identifier forming a security-critical control application is assigned for control applications which require selected security authorizations, identifiers being formed by tags which are each addable as a character string to metadata for a respective control application;

a runtime environment formed via a server device;

at least one runtime control component for providing the respective control application, the runtime control component being loadable into the runtime environment formed via the server device and executed therein;

wherein the system is configured such that the control applications which require the selected security authorizations are each assigned the respective identifier which classifies each control application as the security-critical control application of the industrial automation system;

wherein at least one expiration condition for the selected security authorizations is defined for each of the control applications to which the identifier which classifies each control application as the security-critical control application is assigned;

wherein the runtime environment is configured, during execution of the runtime control components, to monitor the respective occurrence of the respective expiration condition for the control applications;

wherein the execution of each runtime control component is terminated upon the occurrence of the respective expiration condition; and wherein the tags are each one of assignable (i) automatically for first control applications, (ii) manually for second control applications and (iii) when publishing memory images or images in an app repository for third control applications.

\* \* \* \* \*